J. KINTZ.

Lanterns.

No. 6,230. Reissued Jan. 12, 1875.

WITNESSES:
John Kemon
C. A. Pettit

INVENTOR:
Joseph Kintz
BY
Munn & Co
ATTORNEYS.

THE GRAPHIC CO. PHOTO-LITH. 39 & 41 PARK PLACE, N.Y.

UNITED STATES PATENT OFFICE.

JOSEPH KINTZ, OF WEST MERIDEN, CONNECTICUT, ASSIGNOR TO HIMSELF AND PATRICK J. CLARK.

IMPROVEMENT IN LANTERNS.

Specification forming part of Letters Patent No. 146,079, dated December 30, 1873; reissue No. 6,230, dated January 12, 1875; application filed August 15, 1874.

*To all whom it may concern:*

Be it known that I, JOSEPH KINTZ, of West Meriden, in the county of New Haven and State of Connecticut, have invented a new and useful Improvement in Lanterns, of which the following is a specification:

The invention will first be fully described, and then pointed out in the claim.

Figure 1:
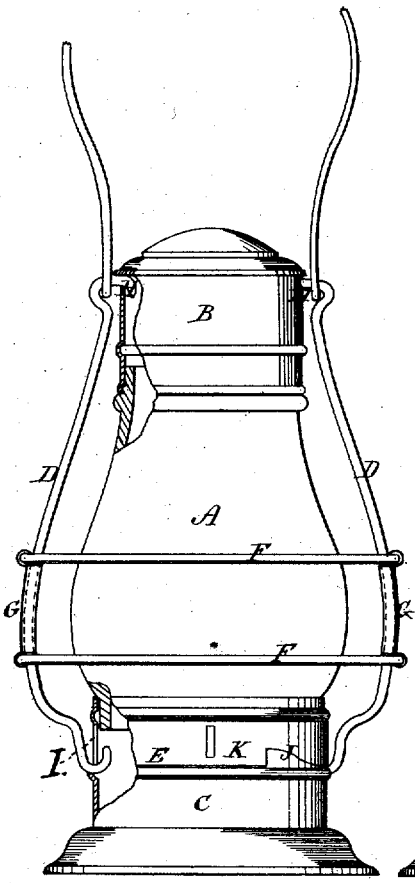
Figure 3:
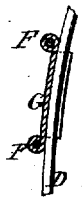
Figure 2:
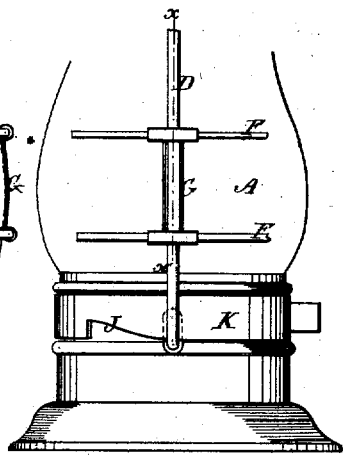

Figure 1 is partly a side elevation and partly a sectional elevation of a lantern constructed according to my invention. Fig. 2 is also a side elevation of the said improved lantern, but it is taken in a plane at right angles to that of Fig. 1; and Fig. 3 is a section of Fig. 2 on the line *x x*.

Similar letters of reference indicate corresponding parts in all the figures.

In this example of my improvement the top B and bottom C of the lantern, between which the globe A is held, are connected together by vertical guards D, which are so arranged and adjusted as to be capable of a vertical movement, whereby the top and bottom of the lantern are made to approach each other, or are permitted to separate, clamping the globe between them in one position, but releasing the globe when in the opposite position. The guards D are hooked into the top B through holes in the sides, as at H, so that the top can swing sidewise. The guards D are also connected with the bottom, so they can swing on it, and the holes I, in which they are hooked, are slotted, so that the guards can move up and down in the slots to some extent. The guards D are so adjusted as to length that when in one position, at or near the lower ends of their slots I, the globe will be clamped or held between the top and bottom of the lantern; but when the guards are moved to or near the opposite position in their slots, then the top and bottom of the lantern may be separated from the globe, and the top may be lifted from the globe and swung aside.

In order to effect the foregoing movements of the guards D in their slots, I combine with the guards and the parts between which the globe is held an annular locking-band, E.

In this example of my improvement the top and bottom B C are, as before stated, the parts between which the globe is held. The locking-band may be moved or partially rotated, and it is provided with inclines J, which act upon the guards D, the arrangement and operation of the locking-band being such that when the band is moved in one direction the guards will be moved in their slots, and the top and bottom of the lattern made to clamp upon the ends of the globe; but when the band is moved in the opposite direction the guards will be free to move in their slots, and the parts between which the globe is held will be loosened, permitting the top to swing off, thus releasing the globe.

F are horizontal guards, which are attached to sliding plates G, which plates slide on the vertical guards D whenever the said guards are moved or swung in opening and closing the parts that hold the globe, as before described.

The sliding horizontal guards serve to stiffen and support the guards D, and assist to keep the parts which hold the globe in proper position.

Having thus described my invention, I claim as new and desire to secure by Letters Patent—

The combination, with base C, having vertical slot I, of the rotary band K, having incline J, for the purpose of locking and unlocking clamp D, in the manner described.

JOSEPH KINTZ.

Witnesses:

C. P. IVES,
O. H. PLATT.